(12) United States Patent
Nwosu et al.

(10) Patent No.: US 12,359,041 B2
(45) Date of Patent: Jul. 15, 2025

(54) THERMOPLASTIC POLYMER COMPOSITION

(71) Applicant: SOLVAY SPECIALTY POLYMERS USA, LLC, Alpharetta, GA (US)

(72) Inventors: Chinomso Nwosu, Alpharetta, GA (US); Vijay Gopalakrishnan, Dunwoody, GA (US)

(73) Assignee: SOLVAY SPECIALTY OPERATIONS USA, LLC, Alpharetta, GA (US)

( * ) Notice: Subject to any disclaimer, the term of this patent is extended or adjusted under 35 U.S.C. 154(b) by 670 days.

(21) Appl. No.: 17/761,632

(22) PCT Filed: Sep. 25, 2020

(86) PCT No.: PCT/EP2020/076954
§ 371 (c)(1),
(2) Date: Mar. 18, 2022

(87) PCT Pub. No.: WO2021/058769
PCT Pub. Date: Apr. 1, 2021

(65) Prior Publication Data
US 2022/0348742 A1    Nov. 3, 2022

Related U.S. Application Data

(60) Provisional application No. 62/906,867, filed on Sep. 27, 2019.

(51) Int. Cl.
C08K 7/28    (2006.01)
C08K 7/14    (2006.01)

(52) U.S. Cl.
CPC . *C08K 7/28* (2013.01); *C08K 7/14* (2013.01)

(58) Field of Classification Search
CPC .............. C08K 3/40; C08K 7/14; C08K 7/28
See application file for complete search history.

(56) References Cited

U.S. PATENT DOCUMENTS

| | | | |
|---|---|---|---|
| 2008/0194751 A1* | 8/2008 | Rexin | ..................... C08L 77/04 |
| | | | 524/424 |
| 2012/0316261 A1 | 12/2012 | Bradley | |
| 2020/0140679 A1* | 5/2020 | Peng | ................. B29C 45/14311 |

FOREIGN PATENT DOCUMENTS

| | | | | |
|---|---|---|---|---|
| CN | 102504528 A | * | 6/2012 | ......... B29C 47/0011 |
| CN | 104194329 A | | 12/2014 | |
| CN | 106280425 A | | 1/2017 | |
| EP | 1630201 A1 | | 3/2006 | |
| EP | 3502511 A1 | | 6/2019 | |
| JP | 2001123011 A | | 5/2001 | |
| JP | 2005015792 A | | 1/2005 | |
| JP | 2005047970 A | | 2/2005 | |
| JP | 2007119669 A | | 5/2007 | |
| JP | 2010248494 A | | 11/2010 | |
| WO | 2003054069 A1 | | 7/2003 | |
| WO | 2008090235 A2 | | 7/2008 | |
| WO | 2014195226 A1 | | 12/2014 | |
| WO | 2019027452 A1 | | 2/2019 | |

OTHER PUBLICATIONS

Machine translation of CN-102504528-A (no date).*
Murphy J., in "Additives for Plastics Handbook", 2nd Edition, 2001, Chapter 5.2.3., p. 43-48—Elsevier Advanced Technology.
Hausrath R.L. et al., in "Fiberglass and Glass Technology", 2010, XIV, Chapter 5, p. 197-225—Wallenberger F.T. and Bingham P.A. (Editors).
"Stabilizers, Processing AIDS, Plasticizers, Fillers, Reinforcements, Colorants for Thermoplastics", Plastics Additives Handbook, 4th Edition, 1993, p. 537-538—HANSER Gardner Publications.

* cited by examiner

*Primary Examiner* — Michael J Feely
(74) *Attorney, Agent, or Firm* — Beatrice C. Ortego

(57) ABSTRACT

The invention pertains to a polymer composition comprising a thermoplastic polymer, a glass fiber, and a hollow glass bead, wherein the ratio of the concentration of the hollow glass bead to the total concentration of the glass fiber and the hollow glass bead ranges from 0.2 to 0.49.

15 Claims, No Drawings

THERMOPLASTIC POLYMER COMPOSITION

This application is a U.S. national stage entry under 35 U.S.C. § 371 of International Application No. PCT/EP2020/076954 filed Sep. 25, 2020, which claims priority to U.S. provisional application No. 62/906,867 filed on Sep. 27, 2019, the whole content of this application being incorporated herein by reference for all purposes.

TECHNICAL FIELD

The present invention relates to a thermoplastic polymer composition, in particular to a thermoplastic polymer composition having excellent dielectric performance and mechanical performance, and to a method for making said thermoplastic polymer composition. The invention further relates to mobile electronic device components including said thermoplastic polymer composition.

BACKGROUND ART

Due to their reduced weight, high mechanical performance and great design options, thermoplastic polymer compositions are attractive as metal replacement in mobile electronic device components.

In particular, thermoplastic polymer compositions containing glass fibers as reinforcing fillers are widely used in mobile electronic device components, due to their high stiffness, high strength and high impact performances. However, said compositions generally exhibit poor dielectric properties, namely high dielectric constant ($D_k$) and high dissipation factor ($D_f$).

Need is therefore felt for thermoplastic polymer compositions that effectively address the appropriate balance of properties required for the mobile electronice device components, in particular need is felt for thermoplastic polymer compositions which have satisfactory dielectric properties in terms of dielectric constant and dissipation factor, while retaining good mechanical properties.

SUMMARY OF INVENTION

In a first aspect, the present invention relates to a polymer composition [composition (C)] comprising:
- a thermoplastic polymer selected from the group consisting of poly(arylene sulphides) (PAS), poly(aryl ether sulfones) (PAES), poly(aryl ether ketones) (PAEK), polyesters (PE), polyamides (PA), and combinations thereof;
- a glass fiber; and
- a hollow glass bead;
- wherein the ratio of the concentration of the hollow glass bead to the total concentration of the glass fiber and the hollow glass bead ranges from 0.2 to 0.49.

In another aspect, the present invention relates to a mobile electronic device component comprising the composition (C) as defined above.

Advantageously, the composition (C) according to the invention shows excellent dielectric performances, namely low dielectric constant ($D_k$) and low dissipation factor ($D_f$), while exhibiting good mechanical properties such as strength and ductility. Thanks to its high dielectric and mechanical performances, the composition (C) according to the invention can be desirably incorporated into mobile electronic device components.

DETAILED DESCRIPTION OF THE INVENTION

Described herein is a polymer composition [composition (C)] comprising a thermoplastic polymer, a glass fiber, and a hollow glass bead, wherein the ratio of the concentration of the hollow glass bead to the total concentration of the glass fiber and the hollow glass bead ranges from 0.2 to 0.49. The thermoplastic polymer is selected from the group consisting of poly(arylene sulphides) (PAS), poly(aryl ether sulfones) (PAES), poly(aryl ether ketones) (PAEK), polyesters (PE), polyamides (PA), and combinations thereof.

It was surprisingly found that by incorporating the hollow glass bead in the claimed ratio, the resulting composition (C) offered a very good compromise between reduction of the dieletric constant ($D_k$) and the dissipation factor ($D_f$) and maintenance of good mechanical properties, notably of high tensile strain, relative to both analogous compositions free of the hollow glass bead as well as relative to analogous compositions incorporating the hollow glass bead in a different ratio. More specifically, it was unexpectedly found that the composition (C) according to the invention exhibited significantly higher tensile strain relative to analogous compositions incorporating the hollow glass bead in a higher ratio.

The ratio of the concentration of the hollow glass bead to the total concentration of the glass fiber and the hollow glass bead in the composition (C) can be expressed with the formula:

$$\frac{W_{GB}}{W_{GB} + W_{GF}},$$

wherein $W_{GB}$ and $W_{GF}$ are, respectively, the weight percentage of the hollow glass bead and the weight percentage of the glass fiber in the composition (C), with respect to the total weight of the composition (C).

In the present description, unless otherwise indicated, the following terms are to be meant as follows.

The term "alkyl", as well as derivative terms such as "alkoxy", "acyl" and "alkylthio", as used herein, include within their scope straight chain, branched chain and cyclic moieties. Examples of alkyl groups are methyl, ethyl, 1-methylethyl, propyl, 1,1-dimethylethyl, and cyclo-propyl.

The term "aryl" refers to a phenyl, indanyl or naphthyl group. The aryl group may comprise one or more alkyl groups, and are called sometimes in this case "alkylaryl"; for example may be composed of an aromatic group and two $C_1$-$C_6$ groups (e.g. methyl or ethyl). The aryl group may also comprise one or more heteroatoms, e.g. N, O or S, and are called sometimes in this case "heteroaryl" group; these heteroaromatic rings may be fused to other aromatic systems. Such heteroaromatic rings include, but are not limited to furanyl, thienyl, pyrrolyl, pyrazolyl, imidazolyl, triazolyl, isoxazolyl, oxazolyl, thiazolyl, isothiazolyl, pyridyl, pyridazyl, pyrimidyl, pyrazinyl and triazinyl ring structures. The aryl or heteroaryl substituents may be unsubstituted or substituted with one or more substituents selected from but not limited to halogen, hydroxy, $C_1$-$C_6$ alkoxy, sulfo, $C_1$-$C_6$ alkylthio, $C_1$-$C_6$ acyl, formyl, cyano, $C_6$-$C_{15}$ aryloxy or $C_6$-$C_{15}$ aryl, provided that the substituents are sterically compatible and the rules of chemical bonding and strain energy are satisfied.

Unless specifically stated otherwise, each alkyl and aryl group may be unsubstituted or substituted with one or more substituents selected from but not limited to halogen, hydroxy, sulfo, $C_1$-$C_6$ alkoxy, $C_1$-$C_6$ alkylthio, $C_1$-$C_6$ acyl, formyl, cyano, $C_6$-$C_{15}$ aryloxy or $C_6$-$C_{15}$ aryl, provided that the substituents are sterically compatible and the rules of chemical bonding and strain energy are satisfied. The term "halogen" or "halo" includes fluorine, chlorine, bromine and iodine, with fluorine being preferred.

According to a preferred embodiment of the invention, the composition (C) consists or, or consists essentially of, the thermoplastic polymer, the glass fiber and the hollow glass bead. The expression "consists essentially of" is intended to denote that the composition (C) comprises the thermoplastic polymer, the glass fiber and the hollow glass bead, and no more than 15 wt. %, preferably no more than 10 wt. %, more preferably no more than 5 wt. %, even more preferably no more than 3 wt. %, most preferably no more than 1 wt. %, of other components.

In some embodiments, the ratio of the concentration of the hollow glass bead to the total concentration of the glass fiber and the hollow glass bead ranges from 0.2 to 0.48, from 0.2 to 0.45, from 0.2 to 0.4, from 0.22 to 0.49, from 0.22 to 0.48, from 0.22 to 0.45, from 0.22 to 0.4, from 0.25 to 0.49, from 0.25 to 0.48, from 0.25 to 0.45, from 0.25 to 0.4.

With respect to dielectric performance, the dielectric constant ("$D_k$") and dissipation factor ("$D_f$") of a polymer composition are significant in determining the suitability for the material in application settings wherein radio communication is present. For example, in mobile electronic devices, the dielectric properties of the material forming the various components and housings can significantly degrade wireless radio signals (e.g. 1 MHz, 1 GHz, 2.4 GHz and 5.0 GHz frequencies) transmitted and received by the mobile electronic device through one or more antennas. The dielectric constant of a material represents, in part, the ability of the material to interact with the electromagnetic radiation and, correspondingly, disrupt electromagnetic signals (e.g. radio signals) travelling through the material. Accordingly, the lower the dielectric constant of a material at a given frequency, the less the material disrupts the electromagnetic signal at that frequency. Similarly, the dissipation factor is proportional to the dielectric loss in a material and, the lower the dissipation factor, the lower the dielectric loss to the material.

The composition (C) according to the invention has excellent dielectric performance (relatively low $D_k$ and $D_f$).

In some embodiments, the composition (C) has a dielectric constant ($D_k$) at 1 MHz of no more than 3.3, no more than 3.2, no more than 3.1, no more than 3.0, no more than 2.9, or no more than 2.8. Additionally or alternatively, in some embodiments, the composition (C) has a $D_k$ at 1 MHz of at least 2.7. In some embodiments, the composition (C) has a $D_k$ at 1 MHz ranging from 2.7 to 3.3, from 2.7 to 3.2, from 2.7 to 3.1, from 2.7 to 3.0, from 2.7 to 2.9, or from 2.7 to 2.8.

In some embodiments, the composition (C) has a dissipation factor ($D_f$) at 1 MHz of no more than 0.015, no more than 0.014, no more than 0.013, no more than 0.012, or no more than 0.010. Additionally or alternatively, in some embodiments, the composition (C) has a $D_f$ at 1 MHz of at least 0.003 or at least 0.004. In some embodiments, the composition (C) has a $D_f$ at 1 MHz ranging from 0.003 to 0.015, from 0.003 to 0.014, from 0.003 to 0.013, from 0.003 to 0.012, from 0.003 to 0.011, from 0.003 to 0.010, from 0.004 to 0.015, from 0.004 to 0.014, from 0.004 to 0.013, from 0.004 to 0.012, from 0.004 to 0.011, from 0.004 to 0.010.

$D_f$ and $D_k$ at 1 MHz can be measured according to ASTM D150. In some embodiments, the composition (C) can have a $D_f$ and $D_k$ in the ranges described above at a frequency of 2.4 GHz. $D_f$ and $D_k$ at 2.4 GHz can be measured according to ASTM D2520 or ASTM D150.

Additionally, as mentioned above, the composition (C) according to the invention has good mechanical performance, in terms of impact strength (notched and un-notched), tensile strength, tensile modulus and notably tensile strain.

In some embodiments, the composition (C) has a tensile strain of at least 2.5%, at least 2.6%, at least 2.8%. Additionally or alternatively, in some embodiments, the composition (C) has a tensile strain of no more than 4.0%, no more than 3.8%, or no more than 3.5%. In some embodiments, the composition (C) has a tensile strain ranging from 2.5% to 4.0%, from 2.5% to 3.8%, from 2.5% to 3.5%, from 2.6% to 4.0%, from 2.6% to 3.8%, from 2.6% to 3.5%, from 2.8% to 4.0%, from 2.8% to 3.8%, or from 2.8% to 3.5%.

In some embodiments, the composition (C) has a tensile strength of at least 80 megaPascals ("MPa"), at least 85 MPa, or at least 90 MPa. Additionally or alternatively, in some embodiments, said composition (C) has a tensile strength of no more than 160 MPa, no more than 150 MPa, or no more than 145 MPa. In some embodiments, said composition (C) has a tensile strength ranging from 80 MPa to 160 MPa, from 80 MPa to 150 MPa, from 80 MPa to 145 MPa, from 85 MPa to 160 MPa, from 85 MPa to 150 MPa, from 85 MPa to 145 MPa, from 90 MPa to 160 MPa, from 90 MPa to 150 MPa, from 90 MPa to 145 MPa.

In some embodiments, said composition (C) has a tensile modulus of at least 6.5 gigaPascals ("GPa"), at least 7.0 GPa, or at least 7.8 GPa. Additionally or alternatively, in some embodiments, said composition (C) has a tensile modulus of no more than 11.8 GPa, no more than 11.0 GPa, or no more than 10.0 GPa. In some embodiments, said composition (C) has a tensile modulus ranging from 6.5 GPa to 11.8 GPa, from 6.5 GPa to 11.0 GPa, from 6.5 GPa to 10.0 GPa, from 7.0 GPa to 11.8 GPa, from 7.0 GPa to 11.0 GPa, from 7.0 GPa to 10.0 GPa, from 7.8 GPa to 11.8 GPa, from 7.8 GPa to 11.0 GPa, from 7.8 GPa to 10.0 GPa.

In some embodiments, said composition (C) has a notched impact strength of at least 6.8 kilojoules per square meter ("$kJ/m^2$"), at least 9.4 $kJ/m^2$, or at least 11.6 $kJ/m^2$. Additionally or alternatively, in some embodiments, said composition (C) has a notched impact strength of no more than 16 $kJ/m^2$, no more than 15 $kJ/m^2$, no more than 14 $kJ/m^2$, no more than 13 $kJ/m^2$. In some embodiments, said composition (C) has a notched impact strength ranging from 6.8 $kJ/m^2$ to 16 $kJ/m^2$, from 6.8 $kJ/m^2$ to 15 $kJ/m^2$, from 6.8 $kJ/m^2$ to 14 $kJ/m^2$, from 6.8 $kJ/m^2$ to 13 $kJ/m^2$, 9.4 $kJ/m^2$ to 16 $kJ/m^2$, from 9.4 $kJ/m^2$ to 15 $kJ/m^2$, from 9.4 $kJ/m^2$ to 14 $kJ/m^2$, from 9.4 $kJ/m^2$ to 13 $kJ/m^2$, 11.6 $kJ/m^2$ to 16 $kJ/m^2$, from 11.6 $kJ/m^2$ to 15 $kJ/m^2$, from 11.6 $kJ/m^2$ to 14 $kJ/m^2$, or from 11.6 $kJ/m^2$ to 13 $kJ/m^2$.

In some embodiments, said composition (C) has an un-notched impact strength of at least 24 $kJ/m^2$, at least 35 $kJ/m^2$, or at least 49 $kJ/m^2$. Additionally or alternatively, in some embodiments, said composition (C) has an un-notched impact strength of no more than 70 $kJ/m^2$, no more than 60 $kJ/m^2$, or no more than 55 $kJ/m^2$. In some embodiments, said composition (C) has an un-notched impact strength of from 24 $kJ/m^2$ to 70 $kJ/m^2$, from 24 $kJ/m^2$ to 60 $kJ/m^2$, from 24 $kJ/m^2$ to 55 $kJ/m^2$, 35 $kJ/m^2$ to 70 $kJ/m^2$, from 35 $kJ/m^2$ to 60 $kJ/m^2$, from 35 $kJ/m^2$ to 55 $kJ/m^2$, from 49 $kJ/m^2$ to 70 $kJ/m^2$, from 49 $kJ/m^2$ to 60 $kJ/m^2$, or from 49 $kJ/m^2$ to 55 $kJ/m^2$.

Tensile strength, tensile strain, tensile modulus and notched impact strength and un-notched impact strength can be measured as described in the Examples.

Thermoplastic Polymer

The term "thermoplastic" is intended to denote a polymer which softens on heating and hardens on cooling at room temperature, which at room temperature exists below its glass transition temperature if fully amorphous or below its melting point if semi-crystalline. It is nevertheless generally preferred for said polymer to be semi-crystalline, which is to say to have a definite melting point; preferred polymers are those possessing a heat of fusion ($\Delta H_f$) of at least 10 J/g, preferably of at least 25 J/g, more preferably of at least 30 J/g, when determined according to ASTM D3418. Without upper limit for heat of fusion being critical, it is nevertheless understood that said polymer will generally possess a heat of fusion of at most 80 J/g, preferably of at most 60 J/g, more preferably of at most 40 J/g.

According to the present invention, the thermoplastic polymer is selected from the group consisting of poly (arylene sulphides) (PAS), poly(aryl ether sulfones) (PAES), poly(aryl ether ketones) (PAEK), polyesters (PE), polyamides (PA), and combinations thereof.

Poly(arylene sulphide) (PAS)

According to an embodiment, the thermoplastic polymer is a poly(arylene sulphide) (PAS).

As used herein, a "poly(arylene sulphide) (PAS)" comprises recurring units ($R_{PAS}$) of formula —(Ar—S)— as the main structural units, wherein Ar is an arylene group. The arylene group can be substituted or unsubstituted. Additionally, a poly(arylene sulphide) (PAS) can include any isomeric relationship of the sulphide linkages in the polymer; e.g., when the arylene group is a phenylene group, the sulphide linkages can be ortho, meta, para, or combinations thereof.

In some embodiments, the poly(arylene sulphide) (PAS) comprises at least 5 mol. %, at least 10 mol. %, at least 20 mol. %, at least 30 mol. %, at least 40 mol. %, at least 50 mol. %, at least 60 mol. %, at least 70 mol. %, at least 80 mol. %, at least 90 mol. %, at least 95 mol. %, at least 99 mol. %, at least 99.5 mol. %, or at least 99.9 mol. % of recurring units ($R_{PAS}$). As used herein, mol. % is relative to the total number of moles of recurring units in the poly (arylene sulphide) (PAS).

Preferably, the poly(arylene sulphide) (PAS) is selected from the group consisting of poly(2,4-toluene sulfide), poly (4,4'-biphenylene sulfide), poly(para-phenylene sulfide), poly(ortho-phenylene sulfide), poly(meta-phenylene sulfide), poly(xylene sulfide), poly(ethylisopropylphenylene sulfide), poly(tetramethylphenylene sulfide), poly(butylcyclohexylphenylene sulfide), poly(hexyldodecylphenylene sulfide), poly(octadecylphenylene sulfide), poly(phenylphenylene sulfide), poly-(tolylphenylene sulfide), poly(benzylphenylene sulfide) and poly[octyl-4-(3-methylcyclopentyl)phenylene sulfide].

In an embodiment, the poly(arylene sulphide) (PAS) is a poly(phenylene sulphide) (PPS) and comprises recurring units ($R_{PPS}$) represented by formula (I):

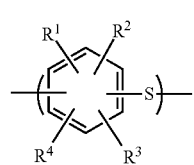

(I)

wherein $R^1$, $R^2$, $R^3$, and $R^4$, equal or different from each other, can be hydrogen atoms or substituents selected from the group consisting of halogen atoms, $C_1$-$C_{12}$ alkyl groups, $C_7$-$C_{24}$ alkylaryl groups, $C_7$-$C_{24}$ aralkyl groups, $C_6$-$C_{24}$ arylene groups, $C_1$-$C_{12}$ alkoxy groups, and $C_6$-$C_{18}$ aryloxy groups.

In its broadest definition, the poly(phenylene sulphide) (PPS) of the present invention can therefore be made of substituted and/or unsubstituted phenylene sulfide groups.

In an embodiment, the polyphenylene sulfide (PPS) comprises recurring units ($R_{PPS}$) represented by the following formula (II):

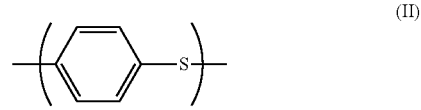

(II)

and is notably commercially available as RYTON® PPS from Solvay Specialty Polymers USA, L.L.C.

In some embodiments, the polyphenylene sulfide (PPS) comprises at least 50 mol. % of recurring units ($R_{PPS}$) of formula (I) and/or formula (II). For example at least about 60 mol. %, at least about 70 mol. %, at least about 80 mol. %, at least about 90 mol. %, at least about 95 mol. %, at least about 99 mol. % of the recurring units in the polyphenylene sulfide (PPS) are recurring units ($R_{PPS}$) of formula (I) and/or formula (II).

According to an embodiment, the composition (C) comprises a plurality of distinct poly(arylene sulphide) polymers, each poly(arylene sulphide) polymer having a distinct recurring unit ($R_{PAS}$).

Poly(aryl ether sulfone) (PAES)

According to an embodiment, the thermoplastic polymer is a poly(aryl ether sulfone) (PAES).

As used herein, a "poly(aryl ether sulfone) (PAES)" denotes any polymer of which at least 50 mol. % of the recurring units are recurring units ($R_{PAES}$) of formula (III):

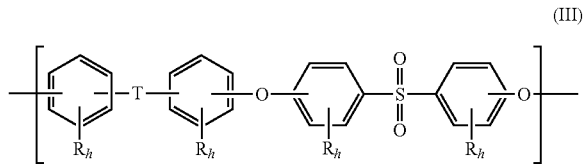

(III)

wherein:
(i) each R, equal to or different from each other, is selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;
(ii) each h, equal to or different from each other, is an integer ranging from 0 to 4; and
(iii) T is selected from the group consisting of a bond, a sulfone group [—S(=O)2-], and a group —C(Rj)(Rk)-, where Rj and Rk, equal to or different from each other, are selected from a hydrogen, a halogen, an alkyl, an alkenyl, an alkynyl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium. Rj and Rk are preferably methyl groups.

Preferably at least 60 mol. %, 70 mol. %, 80 mol. %, 90 mol. %, 95 mol. %, 99 mol. %, and most preferably all of recurring units in the poly(aryl ether sulfone) (PAES) are recurring units ($R_{PAES}$) of formula (III). As used herein, mol. % is relative to the total number of moles of recurring units in the poly(aryl ether sulfone) (PAES).

In an embodiment, the poly(aryl ether sulfone) (PAES) is a poly(biphenyl ether sulfone). A poly(biphenyl ether sulfone) polymer is a poly(aryl ether sufone) which comprises a biphenyl moiety. The poly(biphenyl ether sulfone) is also known as polyphenyl sulfone (PPSU) and for example results from the condensation of 4,4'-dihydroxybiphenyl (biphenol) and 4,4'-dichlorodiphenyl sulfone.

As used herein, a "poly(biphenyl ether sulfone) (PPSU)" denotes any polymer of which more than 50 mol. % of the recurring units are recurring units ($R_{PPSU}$) of formula (III-A):

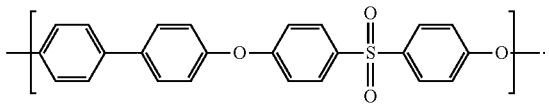

Preferably at least 60 mol. %, 70 mol. %, 80 mol. %, 90 mol. %, 95 mol. %, 99 mol. %, and most preferably all of the recurring units in the poly(biphenyl ether sulfone) (PPSU) are recurring units of formula (III-A).

The poly(biphenyl ether sulfone) (PPSU) can be prepared by known methods and is notably available as RADEL® PPSU from Solvay Specialty Polymers USA, L.L.C.

In an embodiment, the poly(aryl ether sulfone) (PAES) is a polyethersulfone (PES).

As used herein, a "poly(ethersulfone) (PES)" denotes any polymer of which at least 50 mol. % of the recurring units are recurring units of formula (III-B):

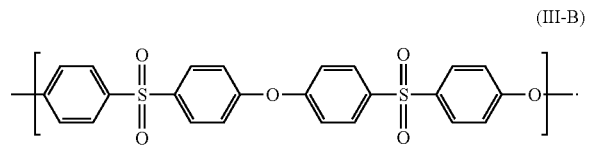

Preferably at least 60 mol. %, 70 mol. %, 80 mol. %, 90 mol. %, 95 mol. %, 99 mol. %, and most preferably all of the recurring units in the poly(ethersulfone) (PES) are recurring units of formula (III-B).

The poly(ethersulfone) (PES) can be prepared by known methods and is notably available as VERADEL® PESU from Solvay Specialty Polymers USA, L.L.C.

In an embodiment, the poly(aryl ether sulfone) (PAES) is a polysulfone (PSU).

As used herein, a "polysulfone (PSU)" denotes any polymer of which at least 50 mol. % of the recurring units are recurring units of formula (III-C):

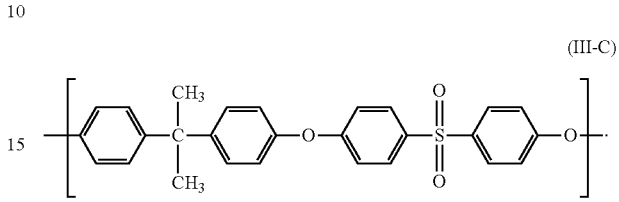

Preferably at least 60 mol. %, 70 mol. %, 80 mol. %, 90 mol. %, 95 mol. %, 99 mol. %, and most preferably all of the recurring units in the PSU are recurring units of formula (III-C).

The polysulfone (PSU) can be prepared by known methods and is available as UDEL® PSU from Solvay Specialty Polymers USA, L.L.C.

According to an embodiment, the composition (C) comprises a plurality of distinct poly(aryl ether sulfone) polymers, the poly(aryl ether sulfone) polymer being preferably selected from the group consisting of polyphenylsulfone (PPSU), poly(ethersulfone) (PES), and polysulfone (PSU).

Poly(aryl ether ketone) (PAEK)

According to an embodiment, the thermoplastic polymer is poly(aryl ether ketone) (PAEK).

As used herein, a "poly(aryl ether ketone) (PAEK)" denotes any polymer comprising more than 50 mol % of recurring units ($R_{PAEK}$), wherein recurring units ($R_{PAEK}$) comprise a Ar—C(O)—Ar' group, wherein Ar and Ar', equal to or different from each other, are aromatic groups.

In some embodiments, the poly(aryl ether ketone) (PAEK) comprises at least 60 mol. %, at least 70 mol. %, at least 80 mol. %, at least 90 mol. %, at least 95 mol. %, or at least 99 mol. %, at least 99.5 mol %, or at least 99.9 mol % of recurring units ($R_{PAEK}$). As used herein, mol. % is relative to the total number of moles of recurring units in the poly(aryl ether ketone) (PAEK).

In some embodiments, the recurring units ($R_{PAEK}$) are selected from the group consisting of formulae (J-A) to (J-O), herein below:

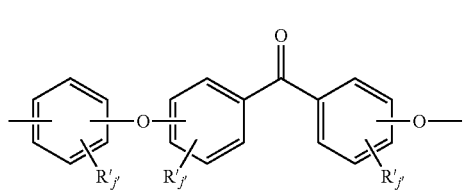
(J-A)

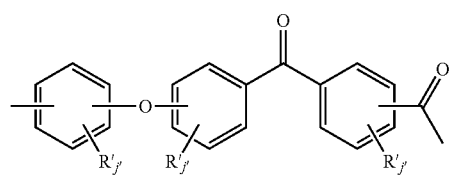
(J-B)

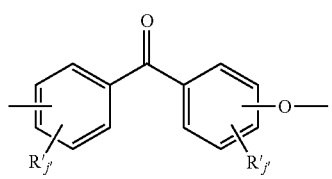
(J-C)

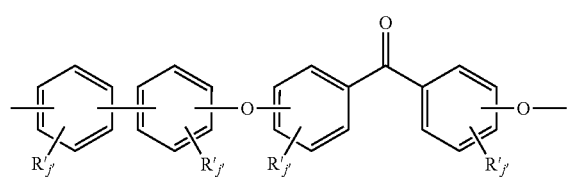
(J-D)

-continued
(J-E)
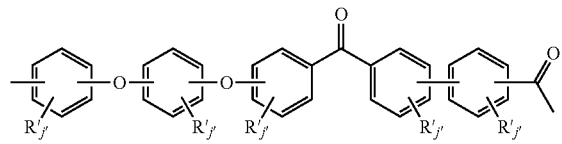
(J-F)
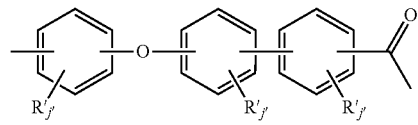
(J-G)
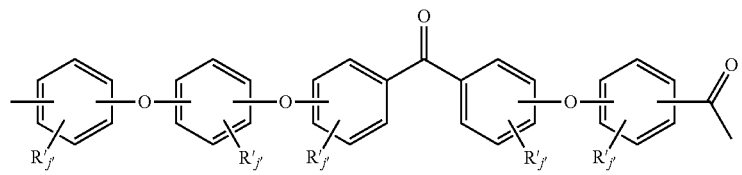
(J-H)
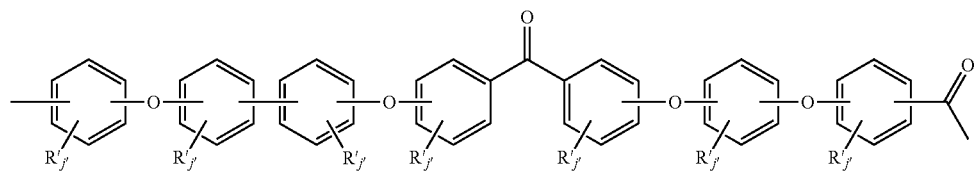
(J-I)
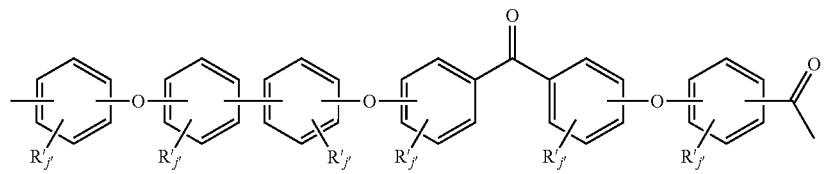
(J-J)
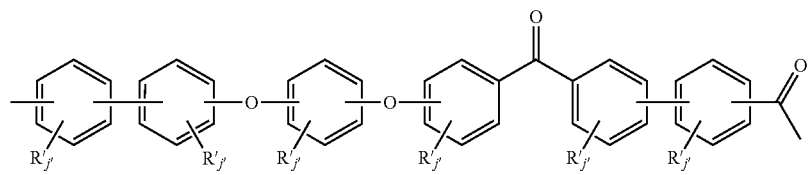
(J-k)
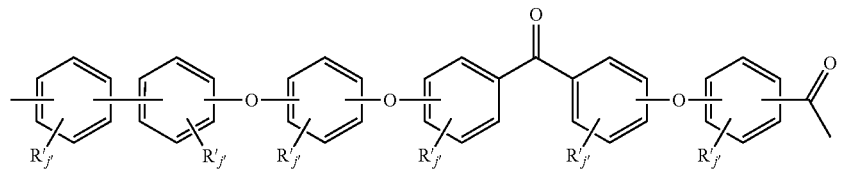
(J-L)
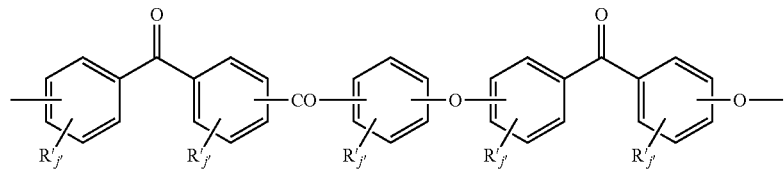
(J-M)
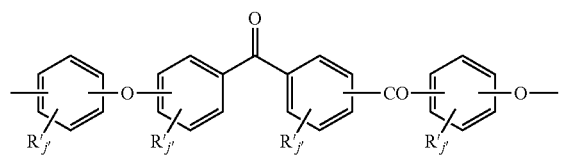
(J-N)
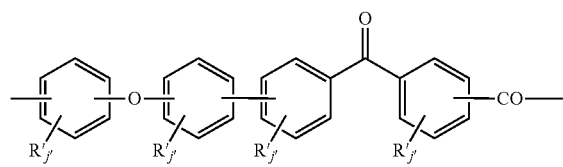

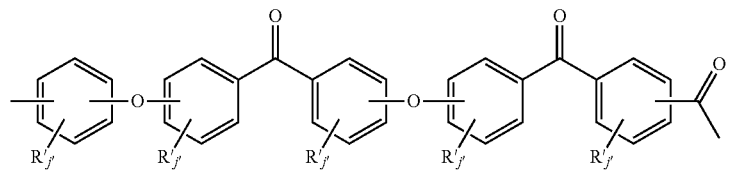

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j' is an integer from 0 to 4.

In recurring unit ($R_{PAEK}$), the respective phenylene moieties may independently have 1,2-, 1,4- or 1,3-linkages to the other moieties different from R' in the recurring unit. Preferably, the phenylene moieties have 1,3- or 1,4-linkages, more preferably they have 1,4-linkage.

In some embodiments, j' in recurring unit ($R_{PAEK}$) is at each occurrence zero. That is to say that the phenylene moieties have no other substituents than those enabling linkage in the main chain of the polymer.

Preferred recurring units ($R_{PAEK}$) are thus selected from those of formulae (J'-A) to (J'-O) herein below:

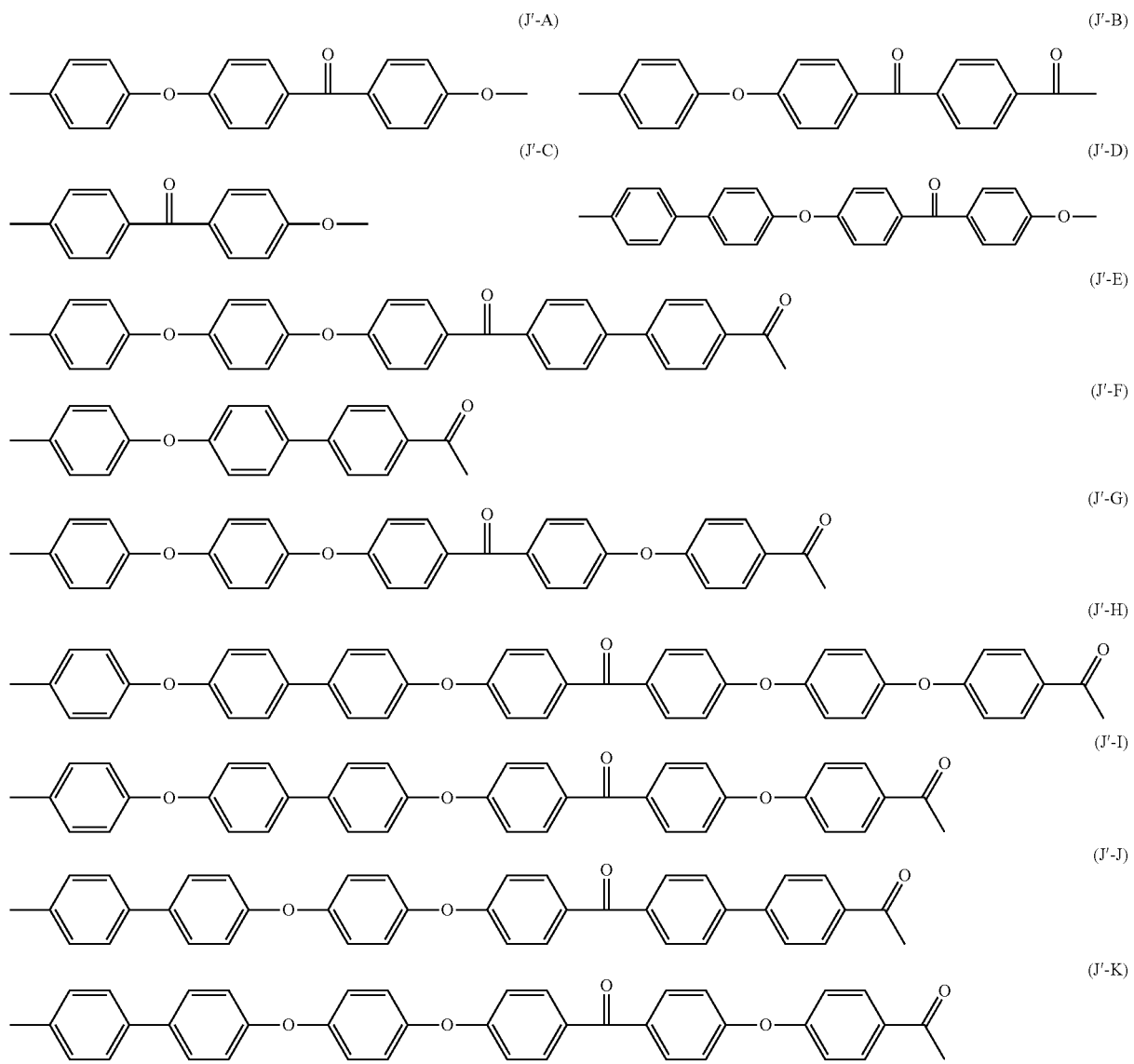

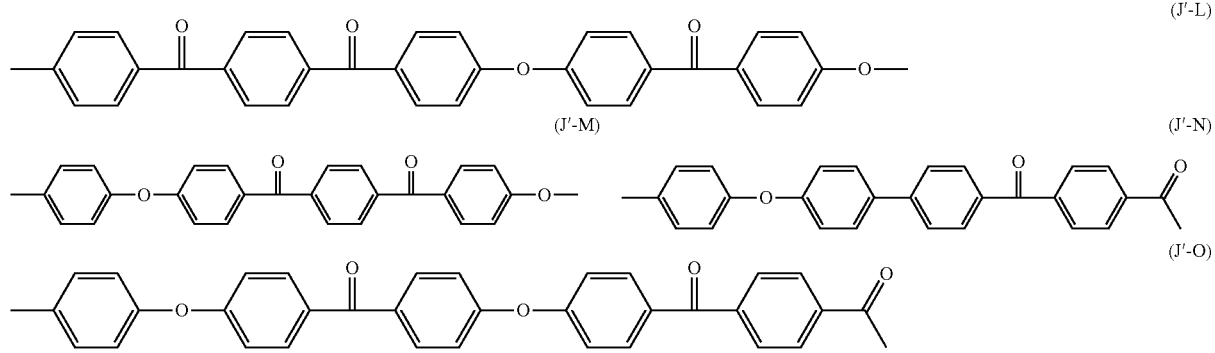

In a preferred embodiment, the polyaryletherketone (PAEK) is a polyetheretherketone (PEEK). In this embodiment, the polyetheretherketone (PEEK) has recurring units ($R_{PEEK}$) represented by either formula (J-A) or (J'-A), preferably recurring unit ($R_{PEEK}$) is represented by formula (J'-A).

According to an embodiment, the composition (C) comprises a plurality of distinct poly(aryl ether ketone) polymers, each poly(aryl ether ketone) polymer having a distinct recurring unit ($R_{PEEK}$).

Polyester (PE)

According to an embodiment, the thermoplastic polymer is a polyester (PE).

As used herein, a "polyester (PE)" denotes a polymer comprising at least 50 mol. %, preferably at least 85 mol. % of recurring units comprising at least one ester moiety (commonly described by the formula: R(C=O)—OR'). Polyesters (PE) may be obtained by ring opening polymerization of a cyclic monomer ($M_A$) comprising at least one ester moiety; by polycondensation of a monomer ($M_B$) comprising at least one hydroxyl group and at least one carboxylic acid group, or by polycondensation of at least one monomer ($M_C$) comprising at least two hydroxyl groups (a diol) and at least one monomer ($M_D$) comprising at least two carboxylic acid groups (a dicarboxylic acid). As used herein, the term dicarboxylic acid is intended to include dicarboxylic acids and any derivative of dicarboxylic acids, including their associated acid halides, esters, half-esters, salts, half-salts, anhydrides, mixed anhydrides, or mixtures thereof.

In an embodiment, the polyester (PE) is selected from the group consisting of aromatic polyesters and polyalkylene esters.

Examples of aromatic polyesters include poly(isophthalate-terephthalate-resorcinol) esters, poly(isophthalate-terephthalate-bisphenol A) esters, poly[(isophthalate-terephthalate-resorcinol)ester-co-(isophthalate-terephthalate-bisphenol A)] esters, and combinations thereof.

Polyalkylene esters include polyalkylene arylates, for example polyalkylene terephthalates and polyalkylene naphthalates. Examples of polyalkylene terephthalates include polyethylene terephthalate (PET), polybutylene terephthalate (PBT), and polypropylene terephthalate (PPT). Examples of polyalkylene naphthalates include polyethylene naphthalate (PEN), and polybutylene naphthalate (PBN).

In an embodiment, the polyester (PE) comprises at least 50 mol. %, preferably at least 60 mol. %, more preferably at least 70 mol. %, still more preferably at least 80 mol. %, most preferably at least 90 mol. %, of recurring units comprising, in addition to the at least one ester moiety, at least one cycloaliphatic group. In an embodiment, the polyester (PE) is essentially composed of recurring units comprising at least one ester moiety and at least one cycloaliphatic group. The cycloaliphatic group may derive from monomers ($M_A$), monomers ($M_B$), monomers ($M_C$) or monomers ($M_D$) comprising at least one group which is both aliphatic and cyclic.

Non limitative examples of monomers ($M_A$) include lactide and caprolactone.

Non limitative examples of monomers ($M_B$) include glycolic acid, 4-hydroxybenzoic acid and 6-hydroxynaphthalene-2-carboxylic acid.

Non limitative examples of monomers ($M_C$) include 1,4-cyclohexanedimethanol, ethylene glycol, 1,2-propanediol, 1,3-propanediol, 1,4-butanediol, 1,5-pentanediol, 1,6-hexanediol, 1,8-octanediol, 1,10-decanediol, 2,2,4-trimethyl 1,3-pentanediol, 2,2,4,4-tetramethyl-1,3-cyclobutanediol, and neopentyl glycol, while 1,4-cyclohexanedimethanol and neopentyl glycol are preferred.

Non limitative examples of monomers ($M_D$) include terephthalic acid, isophthalic acid, naphthalene dicarboxylic acids, 1,4-cyclohexane dicarboxylic acid, succinic acid, sebacic acid, and adipic acid, while terephthalic acid and 1,4-cyclohexane dicarboxylic acid are preferred.

When the polyester (PE) is a copolymer, monomers ($M_C$) and ($M_D$) are preferably used. In such a case, monomer ($M_C$) is preferably 1,4-cyclohexanedimethanol and monomer ($M_D$) is preferably a mixture of terephthalic acid and 1,6-naphthalene dicarboxylic acid.

When the polyester (PE) is a homopolymer, it may be selected from poly(cyclohexylenedimethylene terephthalate) (PCT) and poly(cyclohexylenedimethylene naphthalate) (PCN).

According to an embodiment, the composition (C) comprises a plurality of distinct polyesters.

Polyamide (PA)

According to an embodiment, the thermoplastic polymer is a polyamide (PA).

As used herein, a "polyamide (PA)" comprises recurring units ($R_{PA}$) comprising amide bonds, which are typically derived from the polycondensation of at least one dicarboxylic acid component (or derivative thereof) and at least one diamine component, and/or from the polycondensation of aminocarboxylic acids and/or lactams.

The expression "derivative thereof" when used in combination with the expression "carboxylic acid" is intended to denote whichever derivative which is susceptible of reacting in polycondensation conditions to yield an amide bond, such as acyl groups.

Preferably, the polyamide (PA) is selected from the group consisting of aliphatic, cycloaliphatic and semi-aromatic polyamides.

According to preferred embodiment, the thermoplastic polymer is an aliphatic polyamide.

As used herein, an aliphatic polyamide includes at least 50 mol % of a recurring unit $R_{PA}$, which has an amide bond (—NH—CO—) and is free of any aromatic and cycloaliphatic groups. Put another way, both the diamine and diacid forming, through polycondensation, recurring units ($R_{PA}$) are free of any aromatic and cycloaliphatic groups. In some embodiments, said aliphatic polyamide has at least 60 mol %, at least 70 mol %, at least 80 mol %, at least 90 mol %, at least 95 mol %, at least 95 mol %, at least 99 mol %, or at least 99.9 mol % of recurring unit ($R_{PA}$).

Preferably, the recurring unit ($R_{PA}$) is represented by the following formula (IV):

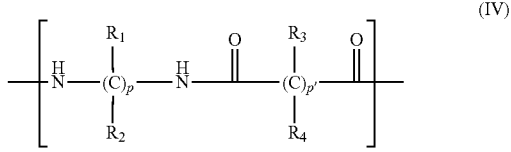

wherein:
$R_1$ to $R_4$, at each location, is independently selected from the group consisting of a hydrogen, an alkyl, an aryl, an alkali or alkaline earth metal sulfonate, an alkyl sulfonate, and a quaternary ammonium;
p is an integer from 4 to 10; and
p' is an integer from 4 to 12.

Preferably, $R_1$ to $R_4$, at each location, is a hydrogen. Preferably, p is 4 to 6. Preferably, p' is 6 to 12.

Preferably, said aliphatic polyamide is selected from the group consisting of PA 4,6; PA 5,6; PA 5,10; PA 6,10; PA 10,10; and PA 10,12. More preferably, said aliphatic polyamide is PA 6,10.

Preferably, said aliphatic polyamide has an inherent viscosity of 0.7 to 1.4 deciliters/g ("dL/g"), as measured according to ASTM D5336.

According to an embodiment, the composition (C) includes a plurality of distinct aliphatic polyamides according to the above description, each aliphatic polyamide having a distinct recurring unit $R_{PA}$.

According to an an embodiment, the composition (C) includes a plurality of distinct thermoplastic polymers. Preferably, at least one of said distinct thermoplastic polymers is selected from the group consisting of aliphatic, cycloaliphatic and semi-aromatic polyamides. Even more preferably, at least one of said distinct thermoplastic polymers is an aliphatic polyamide.

According to an embodiment, the composition (C) includes one polyamide or a plurality of distinct polyamides, preferably one aliphatic polyamide or a plurality of distinct aliphatic polyamides, and do not include any other thermoplastic polymer.

In some embodiments, the composition (C) comprises said thermoplastic polymer or said plurality of distinct thermoplastic polymers in a concentration of at least 30 wt. %, at least 40 wt. %, at least 45 wt. %, or at least 50 wt. %, with respect to the total weight of the composition (C). Additionally or alternatively, in some embodiments, the composition (C) comprises said thermoplastic polymer or said plurality of distinct thermoplastic polymers in a concentration of at most 80 wt. %, at most 70 wt. %, at most 65 wt. %, or at most 60 wt. %, with respect to the total weight of the composition (C). In some embodiments, the concentration of said thermoplastic polymer or said plurality of distinct thermoplastic polymers is from 30 wt. % to 80 wt. %, from 30 wt. % to 70 wt. %, from 30 wt. % to 65 wt. %, from 30 wt. % to 60 wt. %, from 40 wt. % to 80 wt. %, from 40 wt. % to 70 wt. %, from 40 wt. % to 65 wt. %, from 40 wt. % to 60 wt. %, from 45 wt. % to 80 wt. %, from 45 wt. % to 70 wt. %, from 45 wt. % to 65 wt. %, from 45 wt. % to 60 wt. %, from 50 wt. % to 80 wt. %, from 50 wt. % to 70 wt. %, from 50 wt. % to 65 wt. %, or from 50 wt. % to 60 wt. %, with respect to the total weight of the composition (C).

In some embodiments, the composition (C) comprises an aliphatic polyamide or a plurality of distinct aliphatic polyamides according to the above description in a concentration of at least 30 wt. %, at least 40 wt. %, at least 45 wt. %, or at least 50 wt. %, with respect to the total weight of the composition (C). Additionally or alternatively, in some embodiments, the composition (C) comprises an aliphatic polyamide or a plurality of distinct aliphatic polyamides according to the above description in a concentration of at most 80 wt. %, at most 70 wt. %, at most 65 wt. %, or at most 60 wt. %, with respect to the total weight of the composition (C). In some embodiments, the composition (C) according to the invention comprises an aliphatic polyamide or a plurality of distinct aliphatic polyamides according to the above description in a concentration from 30 wt. % to 80 wt. %, from 30 wt. % to 70 wt. %, from 30 wt. % to 65 wt. %, from 30 wt. % to 60 wt. %, from 40 wt. % to 80 wt. %, from 40 wt. % to 70 wt. %, from 40 wt. % to 65 wt. %, from 40 wt. % to 60 wt. %, from 45 wt. % to 80 wt. %, from 45 wt. % to 70 wt. %, from 45 wt. % to 65 wt. %, from 45 wt. % to 60 wt. %, from 50 wt. % to 80 wt. %, from 50 wt. % to 70 wt. %, from 50 wt. % to 65 wt. %, or from 50 wt. % to 60 wt. %, with respect to the total weight of the composition (C).

Glass Fiber

Glass fibers are silica-based glass compounds that contain several metal oxides which can be tailored to create different types of glass. The main oxide is silica in the form of silica sand; the other oxides such as calcium, sodium and aluminum are incorporated to reduce the melting temperature and impede crystallization. The glass fibers can be added as endless fibers or as chopped glass fibers. The glass fibers have generally an equivalent diameter of 5 to 20 μm, preferably of 5 to 15 μm, more preferably of 5 to 10 μm. All glass fiber types, such as A, C, D, E, M, R, S, T glass fibers (as described in chapter 5.2.3, pages 43-48 of Additives for Plastics Handbook, 2nd ed, John Murphy) and any mixture thereof may be used.

E, R, S and T glass fibers are well known in the art. They are notably described in Fiberglass and Glass Technology, Wallenberger, Frederick T.; Bingham, Paul A. (Eds.), 2010, XIV, chapter 5, pages 197-225. R, S and T glass fibers are composed essentially of oxides of silicon, aluminium and magnesium. In particular, these glass fibers comprise typically from 62-75 wt. % of $SiO_2$, from 16-28 wt. % of $Al_2O_3$ and from 5-14 wt. % of MgO. On the other hand, R, S and T glass fibers comprise less than 10 wt. % of CaO.

In some embodiments, the glass fiber is a high modulus glass fiber. High modulus glass fibers have an elastic modulus of at least 76, preferably of at least 78, more preferably of at least 80, and most preferably of at least 82 GPa, as measured according to ASTM D2343. Examples of high modulus glass fibers include, but are not limited to, S, R, and T glass fibers. For example, commercially available high modulus glass fibers are S-1 and S-2 glass fibers from Taishan and AGY, respectively.

In some embodiments, the glass fiber is a low $D_k$ glass fiber. Low $D_k$ glass fibers have a dielectric constant ranging from 4.0 to 5.5, from 4.0 to 5.4, from 4.0 to 5.3, from 4.0 to 5.2, from 4.0 to 5.1, or from 4.0 to 5.0, at a frequency of 1 MHz, 600 MHz, 1 GHz and 2.4 GHz. Low $D_k$ glass fibers can also have a low $D_f$ ("low $D_k/D_f$ glass fiber"). Such glass fibers have a $D_f$ ranging from 0.0005 to 0.001, at a frequency of 1 MHz, 1 GHz, 600 MHz and 2.4 GHz. The $D_f$ and $D_k$ of the glass fibers can be measured according to ASTM D150 (1.0 MHz) and ASTM D2520 (600 MHz, 1.0 Ghz and 2.4 GHz). In some embodiments, the glass fiber is a high modulus and low $D_k$ glass fiber.

The morphology of the glass fiber is not particularly limited. The glass fiber can have a circular cross-section ("round glass fiber") or a non-circular cross-section ("flat glass fiber"). The cross-section is taken in a plane perpendicular to the length of the glass fiber. A non-circular cross-section has a major dimension, which corresponds to the longest dimension in the cross section, and a minor dimension, which is perpendicular to both the major dimension and the length of the glass fiber. The non-circular cross section can be, but is not limited to, oval, elliptical or rectangular.

In some embodiments wherein the composition (C) includes a flat glass fiber, the major dimension of the non-circular cross-section is preferably at least 15 μm, more preferably at least 20 μm, even more preferably at least 22 μm, most preferably at least 25 μm, and is preferably at most 40 μm, more preferably at most 35 μm, even more preferably at most 32 μm, most preferably at most 30 μm. In some embodiments, the major dimension of the non-circular cross-section ranges from 15 to 35 μm, preferably from 20 to 30 μm, more preferably from 25 to 29 μm.

In some embodiments wherein the composition (C) includes a flat glass fiber, the minor dimension of the non-circular cross-section is preferably at least 4 μm, more preferably at least 5 μm, even more preferably at least 6 μm, most preferably at least 7 μm, and is preferably at most 25 μm, more preferably at most 20 μm, even more preferably at most 17 μm, most preferably at most 15 μm. In some embodiments, the minor dimension of the non-circular cross-section ranges from 5 to 20, preferably from 5 to 15 μm, more preferably from 7 to 11 μm.

In some embodiments wherein the composition (C) includes a flat glass fiber, said flat glass fiber has an aspect ratio preferably of at least 2, more preferably of at least 2.2, even more preferably of at least 2.4, most preferably of least 3, and preferably of at most 8, more preferably of at most 6, even more preferably of at most 4. In some embodiments, said flat glass fiber has an aspect ratio ranging from 2 to 6, preferably from 2.2 to 4. The aspect ratio is defined as a ratio of the major dimension of the cross-section of the flat glass fiber to the minor dimension of the same cross-section. The aspect ratio can be measured according to ISO 1888.

In some embodiments wherein the composition (C) includes a round glass fiber, said round glass fiber has an aspect ratio which is preferably less than 2, more preferably less than 1.5, even more preferably less than 1.2, still more preferably less than 1.1, most preferably less than 1.05. Of course, the person of ordinary skill in the art will understand that regardless of the morphology of the glass fiber (e.g. round or flat), the aspect ratio cannot, by definition, be less than 1.

In some embodiments, said composition (C) comprises the glass fiber in a concentration of at least 10 wt. %, at least 15 wt. %, at least 20 wt. %, at least 25 wt. %, or at least 30 wt. %. Additionally or alternatively, in some embodiments, said composition (C) comprises the glass fiber in a concentration of at most 45 wt. %, or at most 40 wt. % with respect to the total weight of the composition (C). In some embodiments, the concentration of the glass fiber is from 10 wt. % to 45 wt. %, from 10 wt. % to 40 wt. %, from 15 wt. % to 45 wt. %, from 15 wt. % to 40 wt. %, from 20 wt. % to 45 wt. %, from 20 wt. % to 40 wt. %, from 25 wt. % to 45 wt. %, from 25 wt. % to 40 wt. %, from 30 wt. % to 45 wt. %, from 30 wt. % to 40 wt. %, with respect to the total weight of the composition (C).

Hollow Glass Bead

Hollow glass beads (also known as hollow glass microspheres or bubbles) are well known and notably are mentioned in Plastics Additives Handbook, Hanser, 4th edition, pages 537-538.

In some embodiments, the hollow glass bead included in the composition (C) has a crush strength of at least 16,000 psi, at least 18,000 psi, at least 20,000 psi, or at least 30,000 psi. The crush strength can be measured according to ASTM D 3102-72. Preferably, the hollow glass bead has a crush strength of about 28,000 psi. Preferably, the hollow glass bead is iM30K glass bubble available from 3M Specialty Materials Co.

In some embodiments, the hollow glass bead included in the composition (C) has an average diameter of from 5 to 50 μm, from 10 to 40 μm, from 15 to 30 μm, or from 20 to 25 μm. Preferably, the hollow glass bead has an average diameter of about 18 μm. The average diameter can be measured by microscopy, preferably scanning electron microscopy (SEM).

In some embodiments, the hollow glass bead included in the composition (C) has a density of from 0.2 to 1.5 $g/cm^3$, from 0.3 to 1.4 $g/cm^3$, from 0.4 to 1.3 $g/cm^3$, from 0.5 to 1.2 $g/cm^3$, from 0.6 to 1.1 $g/cm^3$, from 0.7 to 1.0 $g/cm^3$, or from 0.8 to 0.9 $g/cm^3$. Preferably, said hollow glass bead has a density of about 0.65 $g/cm^3$. The density can be measured according to ASTM D 2840-69.

In some embodiments, the composition (C) comprises the hollow glass bead in a concentration of at least 10 wt. %, or at least 12 wt. %, with respect to the total weight of the composition (C). Additionally or alternatively, in some embodiments, the composition (C) comprises the hollow glass bead in a concentration of at most 25 wt. %, at most 22 wt. %, or at most 20 wt. %, with respect to the total weight of the composition (C). In some embodiments, the concentration of the hollow glass bead is from 10 wt. % to 25 wt. %, from 10 wt. % to 22 wt. %, from 10 wt. % to 20 wt. %, from 12 wt. % to 25 wt. %, from 12 wt. % to 22 wt. %, from 12 wt. % to 20 wt. %, with respect to the total weight of the composition (C).

Optional Additives

In some embodiments, the composition (C) according to the invention includes an additive selected from the group consisting of ultra-violet ("UV") stabilizers, heat stabilizers, pigments, dyes, flame retardants, impact modifiers, lubricants and any combination of one or more thereof.

In some embodiments in which the composition (C) includes optional additives, the total concentration of additives is no more than 15 wt. %, no more than 10 wt. %, no more than 5 wt. %, no more than 1 wt. %, no more than 0.5 wt. %, no more than 0.4 wt. %, no more than 0.3 wt. %, no more than 0.2 wt. %, or no more than 0.1 wt. %.

Method

The composition (C) according to the invention can be made using methods well known in the art.

For example, In an embodiment, the composition (C) is made by melt-blending the thermoplastic polymer, the glass fiber, the hollow glass bead, and any optional additives. Any suitable melt-blending method may be used for combining the components of the composition (C).

For example, in an embodiment, all of the components of the composition (C) (i.e. the thermoplastic polymer, the glass fiber, the hollow glass bead, and any optional additives) are fed into a melt mixer, such as single screw extruder or twin screw extruder, agitator, single screw or twin screw kneader, or Banbury mixer. The components can be added to the melt mixer all at once or gradually in batches. When said components are gradually added in batches, a part of the components is first added and then is melt-mixed with the remaining part of the components, which are subsequently added, until an adequately mixed composition is obtained.

If a glass fiber presents a long physical shape (for example, a long glass fiber), drawing extrusion molding may be used to prepare a reinforced composition.

Mobile Electronic Device

Due to its surprisingly improved dielectric performance and good mechanical performance, the composition (C) according to the description above can be desirably integrated into mobile electronic device components.

The term "mobile electronic device" is intended to denote an electronic device that is designed to be conveniently transported and used in various locations. Representative examples of mobile electronic devices may be selected from the group consisting of mobile electronic phones, personal digital assistants, laptop computers, tablet computers, radios, cameras and camera accessories, watches, calculators, music players, global positioning system receivers, portable games, hard drives and other electronic storage devices. Preferred mobile electronic devices include laptop computers, tablet computers, mobile electronic phones and watches.

Components of mobile electronic devices of interest herein include, but are not limited to, fitting parts, snap fit parts, mutually moveable parts, functional elements, operating elements, tracking elements, adjustment elements, carrier elements, frame elements, switches, connectors, cables, antenna splits, housings, and any other structural part other than housings as used in mobile electronic devices, such as for example speaker parts. Said mobile electronic device components can be notably produced by injection molding, extrusion or other shaping technologies.

A "mobile electronic device housing" refers to one or more of the back cover, front cover, antenna housing, frame and/or backbone of a mobile electronic device. The housing may be a single article or comprise two or more components. A "backbone" refers to a structural component onto which other components of the device, such as electronics, microprocessors, screens, keyboards and keypads, antennas, battery sockets, and the like are mounted. The backbone may be an interior component that is not visible or only partially visible from the exterior of the mobile electronic device. The housing may provide protection for internal components of the device from impact and contamination and/or damage from environmental agents (such as liquids, dust, and the like). Housing components such as covers may also provide substantial or primary structural support for and protection against impact of certain components having exposure to the exterior of the device such as screens and/or antennas.

In a preferred embodiment, the mobile electronic device housing is selected from the group consisting of a mobile phone housing, an antenna housing, a tablet housing, a laptop computer housing, a tablet computer housing or a watch housing.

The mobile electronic device components can be made from the composition using any suitable melt-processing method. For example, the mobile electronic device components can be made by injection molding or extrusion molding the polymer composition. Injection molding is a preferred method.

The invention will now be described with reference to the following examples, whose purpose is merely illustrative and not intended to limit the scope of the invention.

Experimental Section

Materials

Radipol® DC40 is a PA 6,10 (aliphatic polyamide polymer) commercially obtained from Radici.

CS(HL)301HP is a low $D_k/D_f$ glass fiber commercially obtained from Chongqing Polycomp International Corp.

iM160K and iM30k are hollow glass beads having a crush strength of 16,000 psi and 28,000 psi, respectively, commercially obtained from 3M.

Calcium stearate is a lubricant commercially obtained from BASF.

Irganox® 1098 is a heat stabilizer commercially obtained from BASF.

Methods

Compounding

Mixtures containing Radipol® DC40, CS(HL)301HP, iM16K or iM30K, calcium stearate and Irganox® were melt-blended in the amounts set in Table 1 below using a Coperion® ZSK-26 co-rotating twin-screw extruder (with an L/D ratio of 48:1, at 200 rpm and 13-18 kg/hr, and with barrel temperature set points of 280° C. and die temperature set points of 245° C.) and subsequently molded according to ASTM D3641 at a melt temperature of 240° C. to 260° C. and mold temperature of 90° C. to 120° C. to form 10 test specimens, i.e. CE1, E2, E3. CE4-CE6, E7, CE8, E9, CE10.

Testing $D_k$ and $D_f$ were measured according to ASTM D150 at 1 MHz. Measurements of $D_k$ and $D_f$ were taken on injection molded discs having dimensions of 50.8 mm diameter by 4.0 mm thickness.

Tensile modulus, tensile strength and tensile strain were measured according to ISO 527-2 on 5 injection molded ISO tensile bars (length of 80±2 mm, width of 10±0.2 mm, thickness of 4±0.2 mm) using 1 mm/minute test speed to measure tensile modulus and, afterwards, 5 mm/minute test speed to measure tensile strength and tensile strain.

The notched Izod impact strength was measured according to ISO 180 on 10 injection molded ISO bars (length of 80±2 mm, width of 10±0.2 mm, thickness of 4±0.2 mm).

The un-notched Izod impact strength was measured according to ISO 180 on 10 injection molded ISO bars (length of 80±2 mm, width of 10±0.2 mm, thickness of 4±0.2 mm).

Results

Table 1 shows the components and the amounts thereof contained in the test specimens CE1, E2, E3. CE4-CE6, E7, CE8, E9, CE10.

Table 1 also shows the ratios of the concentration of the hollow glass bead to the total concentration of the glass fibers and the hollow glass bead ("hollow glass bead concentration ratio") in the test specimens, which is expressed as:

$$\frac{W_{GB}}{W_{GB} + W_{GF}},$$

wherein $W_{GB}$ and $W_{GF}$ are, respectively, the weight percentage of the hollow glass bead and the weight percentage of the glass fiber in the test specimens.

Test specimens CE1, E2, E3, CE4, CE5 contain a total amount of the glass fiber and the hollow glass bead which is 50 wt. %, based on the total weight of the test specimen.

Test specimens CE6, E7, CE8 contain a total amount of the glass fiber and the hollow glass bead which is 40 wt. %, based on the total weight of the test specimen.

Test specimens E2, E3, CE4, CE5, E7, CE8 contain iM30K as the hollow glass bead.

Test specimens E9, CE10 contain iM16K as the hollow glass bead.

As used herein, specimens labelled with "E" are examples according to the inventions and specimens labelled with "CE" are counterexamples.

specimens CE1 and CE6, which do not contain the hollow glass bead, as well as with respect to test specimens CE4, CE5, CE8 and CE10, which have a higher ratio of the concentration of the hollow glass bead to the total concentration of the glass fiber and the hollow glass bead.

Test specimens CE1 and CE6 (which are free of the hollow glass bead) have excellent mechanical properties in terms of high tensile modulus, tensile strength, tensile strain, notched and un-notched impact strength, but show poor dielectric properties (i.e. high $D_k$ and $D_f$).

Test specimens CE4, CE5, CE8 and CE10 (which have a higher hollow glass bead concentration ratio) have satisfactory dieletric properties in terms of low $D_k$ and $D_f$, but poor mechanical properties.

Test specimens E2, E3, E7 and E9 (which are object of the present invention) effectively address the appropriate balance of properties, since they exhibit low $D_k$ and $D_f$ and satisfactory mechanical properties.

While the tensile modulus, the tensile strength, the notched and un-notched impact strength decrease linearly with increasing the hollow glass bead concentration ratio, the tensile strain unexpectedly shows a plateau-like behaviour with increasing the hollow glass bead concentration

TABLE 1

| | Thermoplastic polymer Radipol® DC40 [wt. %] | Glass fiber CS(HL)301HP [wt. %] | Hollow glass bead | | Additives Calcium stearate/ Irganox® 1098 [wt. %] | $\frac{W_{GB}}{W_{GB} + W_{GF}}$ |
| | | | iM30K [wt. %] | iM16K [wt. %] | | |
|---|---|---|---|---|---|---|
| CE1 | 49.7 | 50 | — | — | 0.3 | — |
| E2 | 49.7 | 40 | 10 | — | 0.3 | 0.2 |
| E3 | 49.7 | 30 | 20 | — | 0.3 | 0.4 |
| CE4 | 49.7 | 10 | 40 | — | 0.3 | 0.8 |
| CE5 | 49.7 | 5 | 45 | — | 0.3 | 0.9 |
| CE6 | 59.7 | 40 | — | — | 0.3 | — |
| E7 | 59.7 | 30 | 10 | — | 0.3 | 0.25 |
| CE8 | 59.7 | 10 | 30 | — | 0.3 | 0.75 |
| E9 | 59.7 | 30 | — | 10 | 0.3 | 0.25 |
| CE10 | 59.7 | 10 | — | 30 | 0.3 | 0.75 |

Table 2 shows the results of dielectric performance testing and mechanical performance testing carried out on the compositions (C) of test specimens CE1, E2-E4, CE5-CE7, E8, E9, CE10, E11, E12, CE13.

TABLE 2

| | $D_k$ at 1 MHz | $D_f$ at 1 Mhz | Tensile modulus [GPa] | Tensile strength [MPa] | Tensile strain [%] | IZOD Notch impact [KJ/m$^2$] | IZOD Un-Notch impact [KJ/m$^2$] |
|---|---|---|---|---|---|---|---|
| CE1 | 3.54 | 0.012 | 13.8 | 193 | 3.9 | 18.6 | 87.7 |
| E2 | 3.22 | 0.011 | 11.7 | 154 | 3.3 | 14.8 | 59.2 |
| E3 | 3.15 | 0.012 | 9.7 | 119 | 2.6 | 11.6 | 49.9 |
| CE4 | 2.60 | 0.009 | 6.2 | 58 | 1.1 | 3.04 | 8.32 |
| CE5 | 2.51 | 0.009 | 5.45 | 49 | 0.98 | 1.78 | 6.69 |
| CE6 | 3.42 | 0.014 | 10.6 | 173 | 4.4 | 19 | 92.2 |
| E7 | 3.26 | 0.013 | 8.8 | 143 | 3.5 | 15.6 | 69.4 |
| CE8 | 2.72 | 0.011 | 5.4 | 56 | 1.7 | 4.15 | 13.5 |
| E9 | 3.15 | 0.013 | 9.2 | 142 | 3 | 13 | 63 |
| CE10 | 2.77 | 0.011 | 5.2 | 54 | 1.1 | 3.34 | 10.7 |

As evident from Table 2, test specimens E2, E3, E7 and E9, which are object of the present invention, provide for a desirable combination of dielectric properties (i.e. low $D_k$ and $D_f$) and mechanical properties, with respect to test ratio from 0.2 (test specimen E2) to 0.4 (test specimen E3). On the other hand, the tensile strain decreases linearly with increasing the hollow glass bead concentration above the claimed ratio.

Further Inventive Concepts

Inventive Concept 1. A polymer composition [composition (C)] comprising:
 a thermoplastic polymer selected from the group consisting of poly(arylene sulphide) (PAS), poly(aryl ether sulfone) (PAES), poly(aryl ether ketone) (PAEK), polyamides (PA), and combinations thereof;
 a glass fiber; and
 a hollow glass bead;
 wherein the ratio of the concentration of the hollow glass bead to the total concentration of the glass fiber and the hollow glass bead ranges from 0.2 to 0.6.

Inventive Concept 2. The composition (C) of inventive concept (1), wherein the ratio of the concentration of the hollow glass bead to the total concentration of the glass fiber and the hollow glass bead ranges from 0.2 to 0.5, from 0.2 to 0.45, from 0.2 to 0.40, from 0.25 to 0.6, from 0.25 to 0.5, from 0.25 to 0.45, from 0.25 to 0.40.

Inventive Concept 3. The composition (C) of inventive concept (1) or (2), wherein the thermoplastic polymer is selected from the group consisting of aliphatic, cycloaliphatic and semi-aromatic polyamides, the thermoplastic polymer being preferably an aliphatic polyamide.

Inventive Concept 4. The composition (C) of inventive concept (3), wherein the polyamide comprises recurring units RPA represented by the following formula (IV):

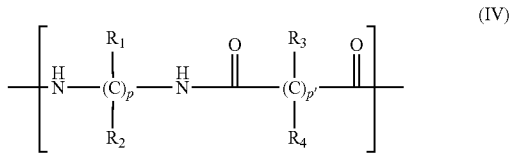

wherein:
R₁ to R₄, at each location, is independently selected from the group consisting of a hydrogen, an alkyl, an aryl, an alkali or alkaline earth metal sulfonate, an alkyl sulfonate, and a quaternary ammonium;
p is an integer from 4 to 10; and
p' is an integer from 4 to 12.

Inventive Concept 5. The composition (C) of inventive concept (4), wherein the polyamide is selected from the group consisting of PA 4,6; PA 5,6; PA 5,10; PA 6,10; PA 10,10; and PA 10,12.

Inventive Concept 6. The composition (C) of any of the previous inventive concepts, wherein the glass fiber has a dielectric constant of 4.0 to 5.5 at a frequency of 1 MHz.

Inventive Concept 7. The composition (C) of any of the previous inventive concepts, wherein the hollow glass bead has a crush strength of at least 16,000 psi.

Inventive Concept 8. The composition (C) of any of the previous inventive concepts, comprising the hollow glass bead in a concentration from 10 to 35 wt. %, preferably from 10 to 30 wt. %, more preferably from 10 to 25 wt. %, even more preferably from 10 to 20 wt. %, based on the total weight of the composition (C).

Inventive Concept 9. The composition (C) of any of the previous inventive concepts, comprising the glass fiber in a concentration from 10 wt. % to 45 wt. %, from 10 wt. % to 40 wt. %, from 15 wt. % to 45 wt. %, from 15 wt. % to 40 wt. %, from 20 wt. % to 45 wt. %, from 20 wt. % to 40 wt. %, from 25 wt. % to 45 wt. %, from 25 wt. % to 40 wt. %, from 30 wt. % to 45 wt. %, from 30 wt. % to 40 wt. %, with respect to the total weight of the composition (C).

Inventive Concept 10. The composition (C) of any of the previous inventive concepts, comprising the thermoplastic polymer in a concentration from 30 wt. % to 80 wt. %, from 30 wt. % to 70 wt. %, from 30 wt. % to 65 wt. %, from 30 wt. % to 60 wt. %, from 40 wt. % to 80 wt. %, from 40 wt. % to 70 wt. %, from 40 wt. % to 65 wt. %, from 40 wt. % to 60 wt. %, from 45 wt. % to 80 wt. %, from 45 wt. % to 70 wt. %, from 45 wt. % to 65 wt. %, from 45 wt. % to 60 wt. %, from 50 wt. % to 80 wt. %, from 50 wt. % to 70 wt. %, from 50 wt. % to 65 wt. %, or from 50 wt. % to 60 wt. %, with respect to the total weight of the composition (C).

Inventive Concept 11. The composition (C) of any of the previous inventive concepts, wherein the composition has a tensile strain of at least 2.5%, preferably of at least 2.6%, more preferably of at least 2.8%.

Inventive Concept 12. The composition (C) of any of the previous inventive concepts, wherein the composition has a tensile strength of at least 80 MPa, preferably of at least 85 MPa, more preferably of at least 90 MPa.

Inventive Concept 13. The composition (C) of any of the previous inventive concepts, wherein the composition has a tensile modulus of at least 6.5 GPa, preferably of at least 7.0 GPa, more preferably of at least 7.8 GPa.

Inventive Concept 14. The composition (C) of any of the previous inventive concepts, wherein the composition has a dielectric constant at 1 MHz of no more than 3.3, preferably of no more than 3.2, more preferably of no more than 3.1, and/or a dissipation factor at 1 MHz of no more than 0.015, preferably of no more than 0.012, more preferably of no more than 0.010.

Inventive Concept 15. A mobile electronic device component comprising the composition (C) according to any of the previous claims, the mobile electronic device component being preferably a mobile electronic device housing.

The embodiments above are intended to be illustrative and not limiting. Additional embodiments are within the inventive concepts. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

The invention claimed is:
1. A polymer composition (C) comprising:
a thermoplastic polymer selected from the group consisting of poly (arylene sulphide) (PAS), poly (aryl ether sulfone) (PAES), poly (aryl ether ketone) (PAEK), polyesters (PE), polyamides (PA), and combinations thereof;
a glass fiber in a concentration of from 30 wt. % to 45 wt. %, with respect to the total weight of the composition (C); and
a hollow glass bead;
wherein the ratio of the concentration of the hollow glass bead to the total concentration of the glass fiber and the hollow glass bead ranges from 0.2 to 0.49;
wherein the glass fiber has a dielectric constant of 4.0 to 5.5 at a frequency of 1 MHz.

2. The composition (C) according to claim 1, wherein the ratio of the concentration of the hollow glass bead to the total concentration of the glass fiber and the hollow glass bead ranges from 0.2 to 0.48.

3. The composition (C) according to claim 1, wherein the thermoplastic polymer is selected from the group consisting of aliphatic, cycloaliphatic and semi-aromatic polyamides.

4. The composition (C) according to claim 3, wherein the polyamide comprises recurring units RPA represented by the following formula (IV):

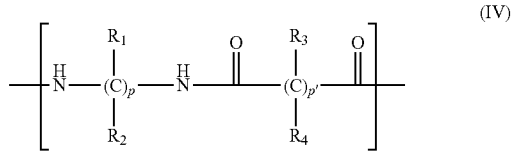

wherein:
R₁ to R₄, at each location, are independently selected from the group consisting of a hydrogen, an alkyl, an aryl, an alkali or alkaline earth metal sulfonate, an alkyl sulfonate, and a quaternary ammonium;
p is an integer from 4 to 10; and
p' is an integer from 4 to 12.

5. The composition (C) according to claim 4, wherein the polyamide is selected from the group consisting of PA 4,6; PA 5,6; PA 5,10; PA 6,10; PA 10,10; and PA 10,12.

6. The composition (C) according to claim 1, wherein the hollow glass bead has a crush strength of at least 16,000 psi.

7. The composition (C) according to claim 1, comprising the hollow glass bead in a concentration from 10 to 25 wt. %, based on the total weight of the composition (C), so long as the ratio of the concentration of the hollow glass bead to the total concentration of the glass fiber and the hollow glass bead ranges from 0.2 to 0.49.

8. The composition (C) according to claim 1, comprising the glass fiber in a concentration from 30 to 40 wt. %, based on the total weight of the composition (C).

9. The composition (C) according to claim 1, comprising the thermoplastic polymer in a concentration from 30 to 62.5 wt. %, based on the total weight of the composition (C).

10. The composition (C) according to claim 1, having a tensile strain of at least 2.5%.

11. The composition (C) according to claim 1, having a tensile strength of at least 80 MPa.

12. The composition (C) according to claim 1, having a tensile modulus of at least 6.5 GPa.

13. The composition (C) according to claim 1, having a dielectric constant at 1 MHz of no more than 3.3, and/or a dissipation factor at 1 MHz of no more than 0.015.

14. A mobile electronic device component comprising the composition (C) according to claim 1.

15. The mobile electronic device component according to claim 14, being a mobile electronic device housing.

* * * * *